US008127162B2

(12) United States Patent
Satoh

(10) Patent No.: US 8,127,162 B2
(45) Date of Patent: Feb. 28, 2012

(54) APPARATUS, METHOD, AND COMPUTER PROGRAM PRODUCT FOR PROCESSING INFORMATION WHICH INCLUDES A POWER-SAVING MODE HAVING A PLURALITY OF SUB POWER MODES

(75) Inventor: Shohichi Satoh, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 588 days.

(21) Appl. No.: 12/268,635

(22) Filed: Nov. 11, 2008

(65) Prior Publication Data

US 2009/0125739 A1 May 14, 2009

(30) Foreign Application Priority Data

Nov. 12, 2007 (JP) ................................. 2007-293114

(51) Int. Cl.
*G06F 1/00* (2006.01)
(52) U.S. Cl. ........................................ 713/322; 713/324
(58) Field of Classification Search .................. 713/300, 713/320–324, 340
See application file for complete search history.

(56) References Cited

U.S. PATENT DOCUMENTS

| 5,742,833 | A  | * | 4/1998  | Dea et al. ...................... 713/323 |
| 6,622,251 | B1 | * | 9/2003  | Lindskog et al. ............. 713/300 |
| 6,848,059 | B2 | * | 1/2005  | Bullman et al. ............... 713/323 |
| 7,562,239 | B2 | * | 7/2009  | Fung ............................. 713/320 |
| 7,779,282 | B2 | * | 8/2010  | Ramachandran et al. ..... 713/323 |
| 7,805,621 | B2 | * | 9/2010  | Kendall et al. ................ 713/300 |
| 2002/0194512 | A1 | * | 12/2002 | Weng et al. .................... 713/300 |
| 2004/0268111 | A1 | * | 12/2004 | Dayan et al. ..................... 713/2 |
| 2005/0223248 | A1 | * | 10/2005 | Lim et al. ...................... 713/300 |

FOREIGN PATENT DOCUMENTS

| JP | 2000-141821 | 5/2000 |
| JP | 2003-191570 | 7/2003 |
| JP | 2004-289361 | 10/2004 |
| JP | 2006-172044 | 6/2006 |

OTHER PUBLICATIONS

U.S. Appl. No. 12/254,396, filed Oct. 20, 2008, Satoh.
Office Action issued Oct. 17, 2011, in Japanese Patent Application No. 2007-293114 filed Nov. 12, 2007 (2 pgs.).

* cited by examiner

*Primary Examiner* — Raymond Phan
(74) *Attorney, Agent, or Firm* — Oblon, Spivak, McClelland, Maier, & Neustadt, L.L.P.

(57) ABSTRACT

A receiving unit receives data from an external network device through a network. A determining unit determines whether a data processing is needed for the data received by the receiving unit. When the determining unit determines that the data processing is needed for the data, a data processing unit performs the data processing on the data. A power control unit switches, according to the data, a power mode of the information processing apparatus between a normal mode in which power is supplied to all components of the information processing apparatus and a power-saving mode in which power supplying is limited to selected components.

20 Claims, 9 Drawing Sheets

FIG. 4

| FIELD | CONDITION |
|---|---|
| ETHERNET HEADER: DESTINATION MAC ADDRESS | BROADCAST ADDRESS OR MAC ADDRESS OF ITS OWN STATION |
| ETHERNET HEADER: TYPE | ARP (0 × 0806) |
| ARP: HARDWARE TYPE | ETHERNET (0 × 0001) |
| ARP: PROTOCOL TYPE | IP (0 × 0800) |
| ARP: HARDWARE SIZE | 0 × 06 |
| ARP: PROTOCOL SIZE | 0 × 04 |
| ARP: OPCODE | REQUEST (0 × 0001) |
| ARP: TARGET MAC ADDRESS | BROADCAST ADDRESS OR MAC ADDRESS OF ITS OWN STATION |
| ARP: TARGET IP ADDRESS | IP ADDRESS OF ITS OWN STATION |

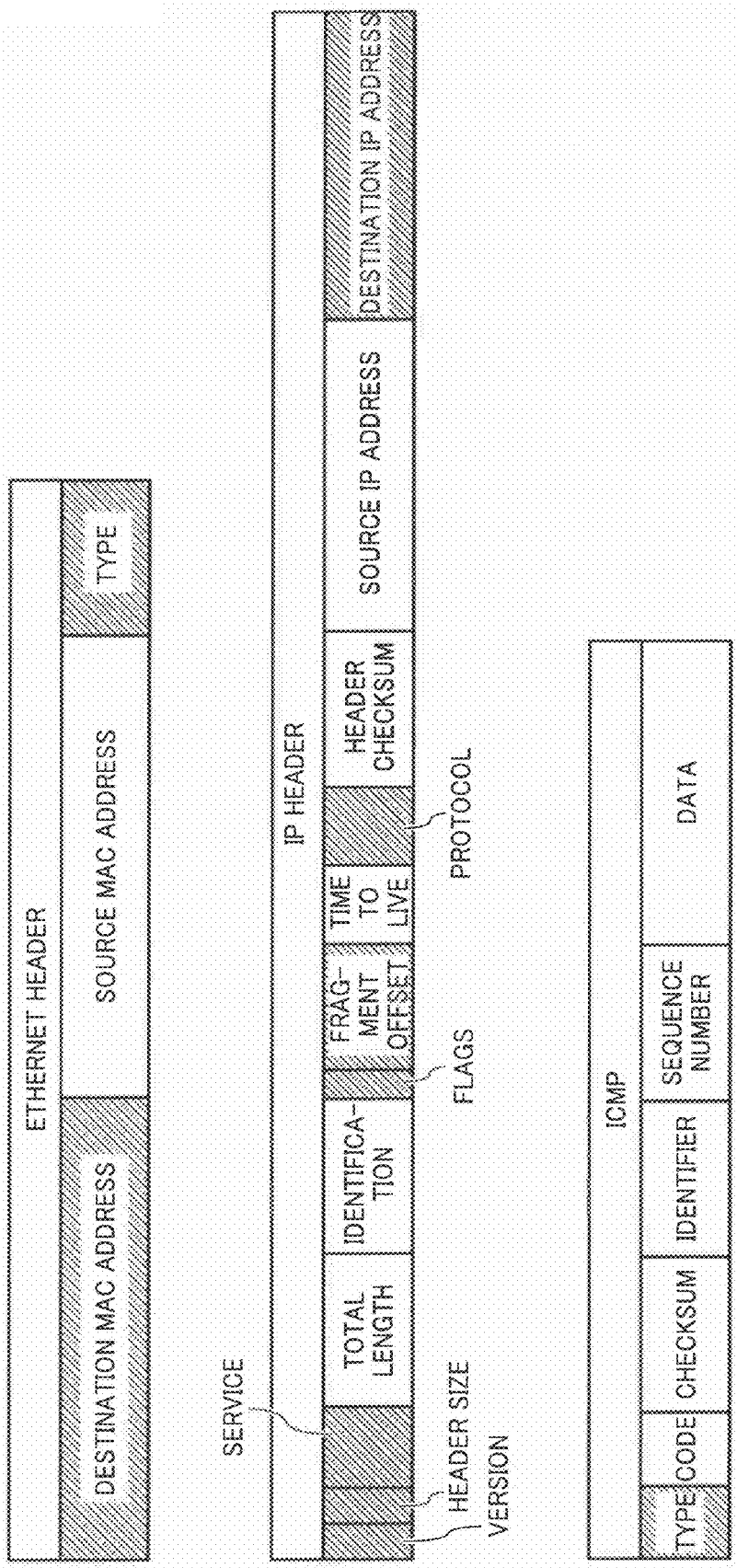

| FIELD | CONDITION |
|---|---|
| ETHERNET HEADER: DESTINATION MAC ADDRESS | MAC ADDRESS OF ITS OWN STATION |
| ETHERNET HEADER: TYPE | IP (0 × 0800) |
| IP HEADER: VERSION | IPv4 (0 × 4) |
| IP HEADER: HEADER SIZE | 20 BYTES (0 × 5) |
| IP HEADER: FLAGS | 0 × 0 |
| IP HEADER: FRAGMENT OFFSET | 0 × 0000 |
| IP HEADER: PROTOCOL | ICMP (0 × 01) |
| IP HEADER: VERSION | IPv4 (0 × 04) |
| IP HEADER: DESTINATION IP ADDRESS | IP ADDRESS OF ITS OWN STATION |
| ICMP: TYPE | ECHO REQUEST (0 × 08) |

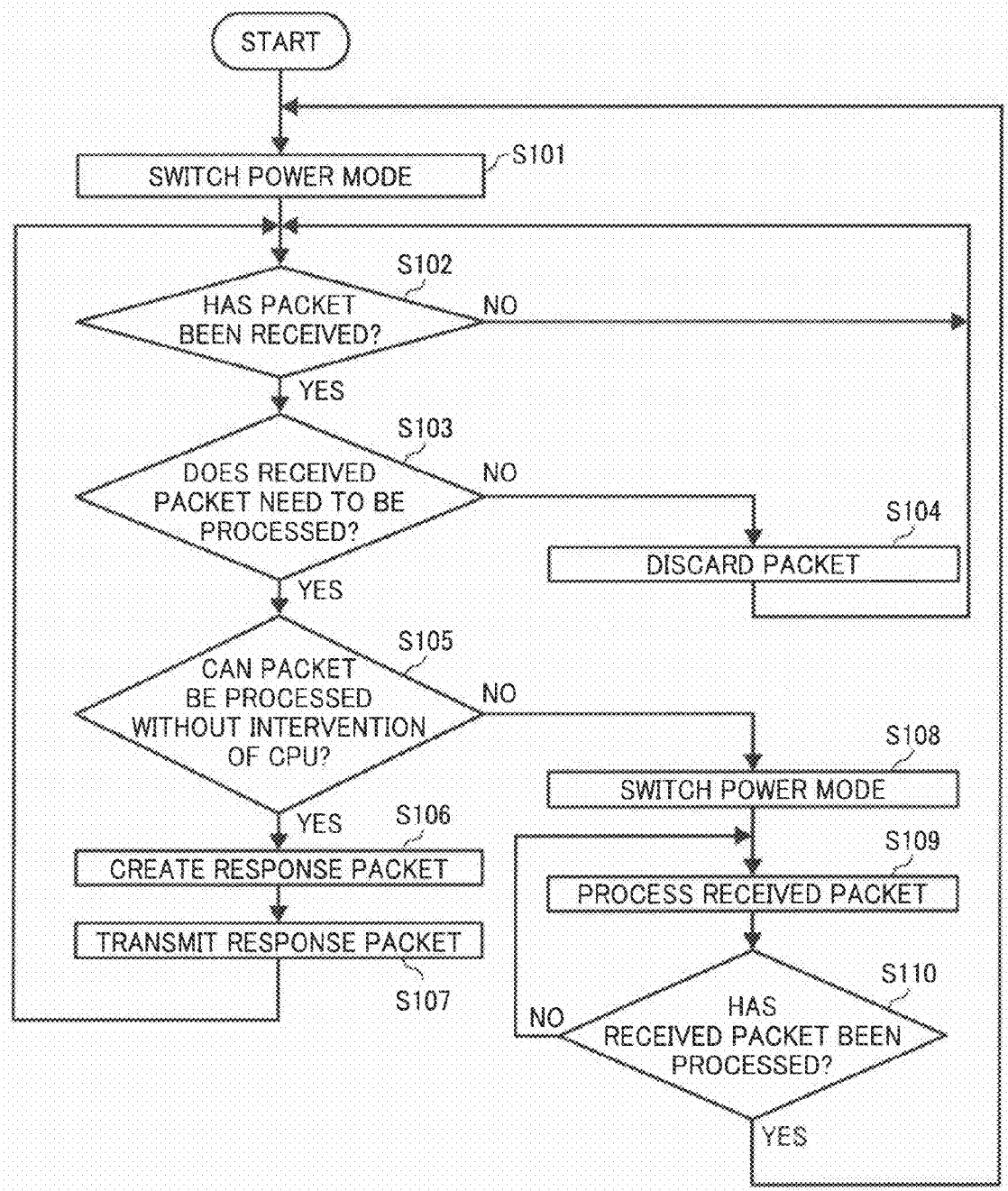

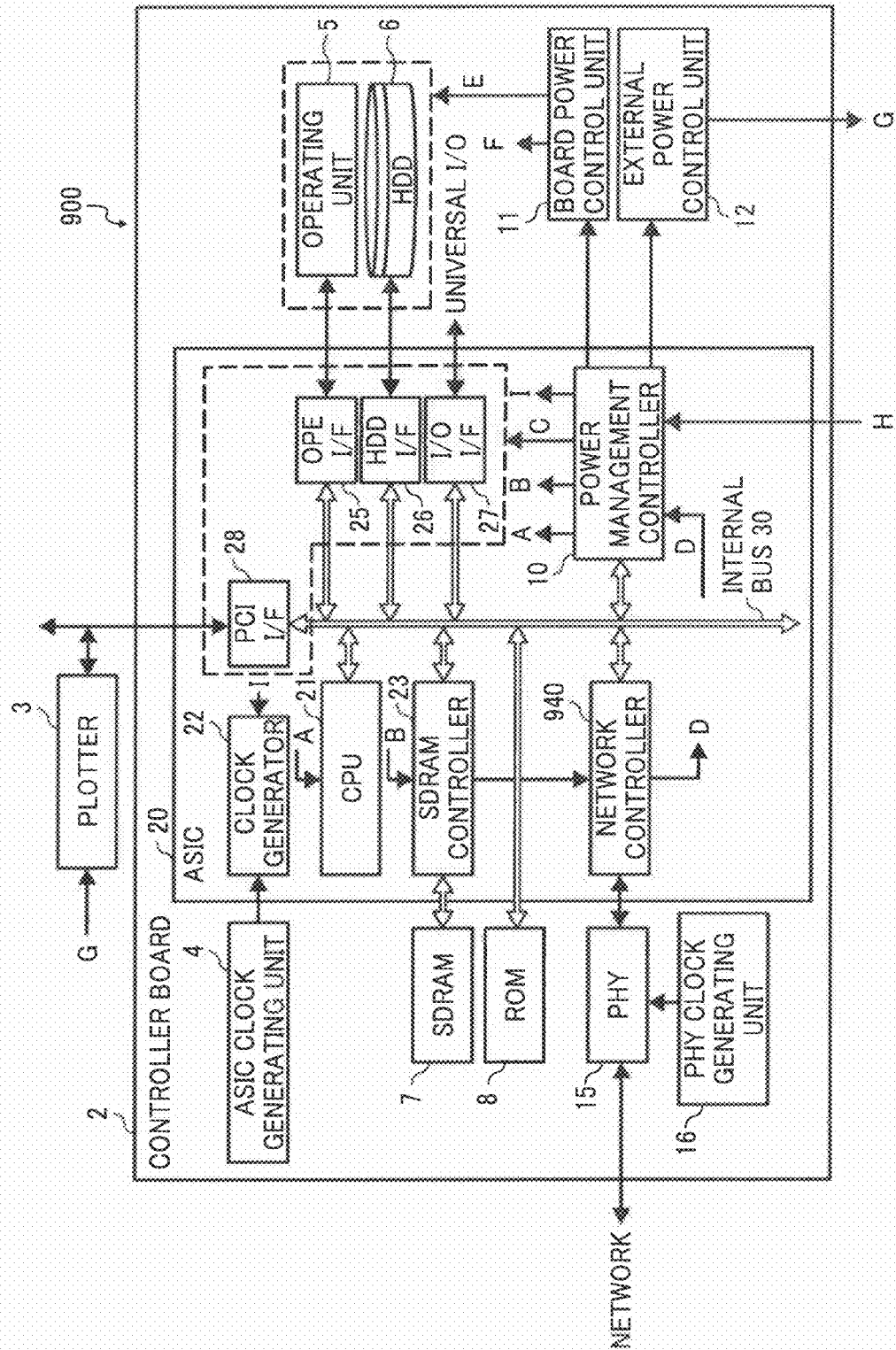

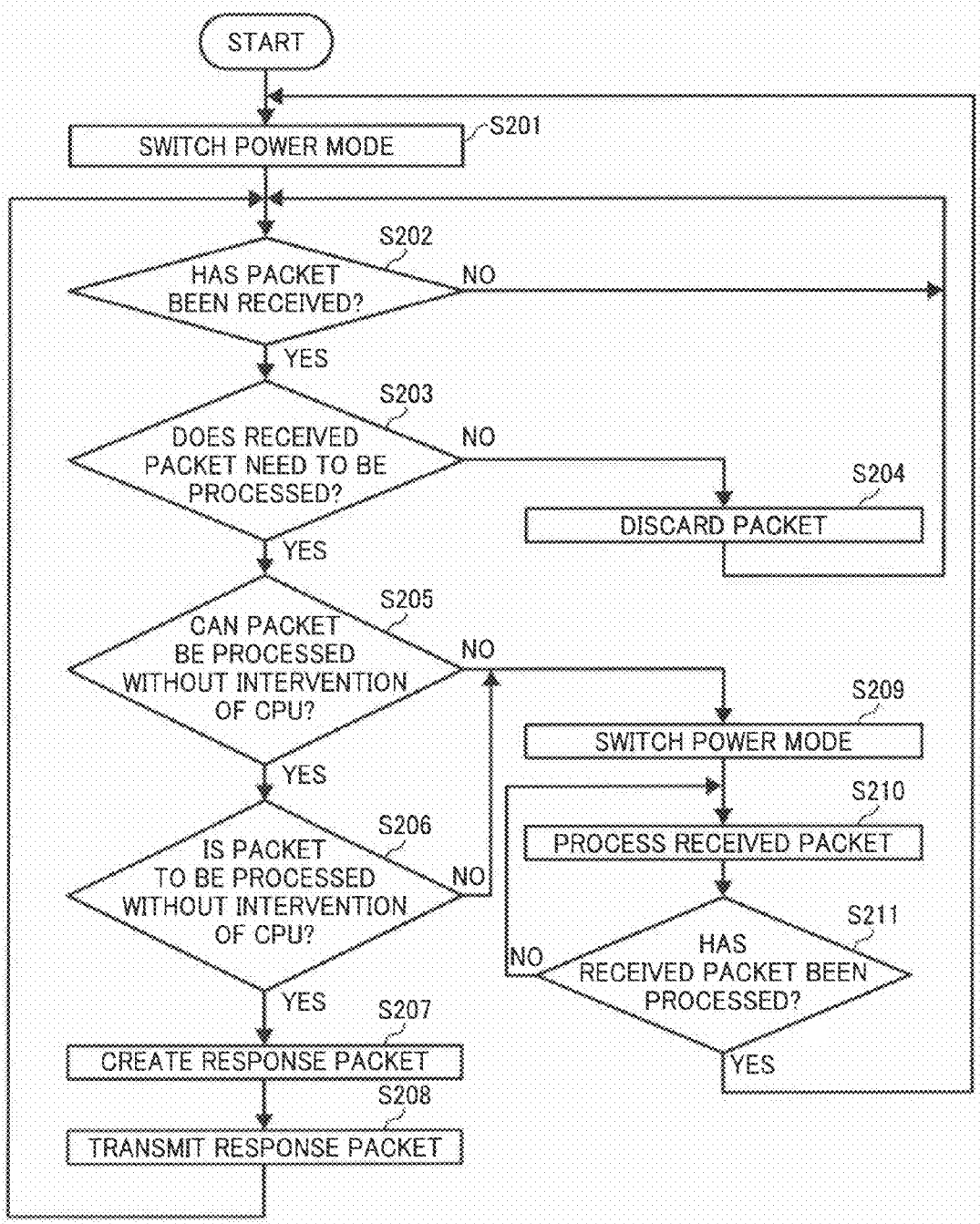

APPARATUS, METHOD, AND COMPUTER PROGRAM PRODUCT FOR PROCESSING INFORMATION WHICH INCLUDES A POWER-SAVING MODE HAVING A PLURALITY OF SUB POWER MODES

CROSS-REFERENCE TO RELATED APPLICATIONS

The present application claims priority to and incorporates by reference the entire contents of Japanese priority document 2007-293114 filed in Japan on Nov. 12, 2007.

BACKGROUND OF THE INVENTION

1. Field of the Invention

The present invention relates to a network-connected information processing apparatus having a power saving mode and an information processing method and a computer program product for the information processing apparatus.

2. Description of the Related Art

Recently, such a network system that a plurality of information processing apparatuses, such as a computer and a printer, is connected to one another by, for example, an Ethernet (Registered Trademark) local area network (LAN) connection thereby enabling data transmission/reception among the information processing apparatuses has been in widespread use. The information processing apparatus typically has a power saving mode in which power supplying to part of the apparatus is temporarily shut off by a control unit including a central processing unit (CPU), thereby reducing power consumption, which is disclosed, for example, in Japanese Patent Application Laid-open No. 2003-191570.

A technology disclosed in Japanese Patent Application Laid-open No. 2003-191570 is such that when an apparatus receives a packet via a network after switching to the power saving mode by the control of a CPU, if the packet does not need to be processed, the packet is discarded by a filter while keeping the power saving mode thereby keeping a low power consumption state for a long time. However, in the above technology, the apparatus performs the power saving control while always keeping the CPU and the like in a normal power mode, so that power is consumed by the CPU and the like even in the power saving mode. Therefore, it is difficult to effectively reduce power consumption.

To address the above problem, for example, an apparatus disclosed in Japanese Patent Application Laid-open No. 2000-141821 is known. This apparatus is switched to the power saving mode by shutting off power supplying to each unit in the apparatus such as a data processing unit and a control unit including a CPU, and includes a unit that, when the apparatus in the power saving mode receives an apparatus-state obtaining request from an external network device, responds to the request while keeping the power saving mode.

However, in the technology disclosed in Japanese Patent Application Laid-open No. 2000-141821, every time the apparatus receives data such as a packet other than the apparatus-state obtaining request, the data needs to be processed by the CPU, and therefore the CPU and the like need to be switched to the normal power mode. Therefore, the apparatus cannot keep the CPU and the like in the low power consumption state for a long time, thus may not be able to obtain sufficient effect of lowering power consumption.

Moreover, in each of the above-described technologies, when the CPU of the data processing unit processes data received via a network, the CPU performs the processing while always keeping the normal power mode regardless of a type of the received data or the like. Therefore, the technologies have a problem in that power is consumed uselessly in some data processing depending upon a type of received data or the like (e.g., a packet that is processed easily by the CPU and a packet for a protocol that does not require fast processing time and response time). Accordingly, in the apparatuses of the above-described technologies, data processing cannot be performed in a power state appropriate for each data, and received data is always processed by the data processing unit in a specific power mode. Thus, power consumption of the apparatus may become large, leading to the need of further reducing power consumption.

SUMMARY OF THE INVENTION

It is an object of the present invention to at least partially solve the problems in the conventional technology.

According to one aspect of the present invention, there is provided an information processing apparatus that is configured to communicate with an external network device through a network. The information processing apparatus includes a receiving unit that receives data from the external network device; a determining unit that determines whether a data processing is needed for the data received by the receiving unit; a data processing unit that, when the determining unit determines that the data processing is needed for the data, performs the data processing on the data; and a power control unit that switches, according to the data, a power mode of the information processing apparatus between a normal mode in which power is supplied to all components of the information processing apparatus and a power-saving mode in which power supplying is limited to selected components.

Furthermore, according to another aspect of the present invention, there is provided an information processing method for an information processing apparatus that is configured to communicate with an external network device through a network. The information processing method includes receiving data from the external network device; determining whether a data processing is needed for the data received at the receiving; performing, when it is determined that the data processing is needed for the data at the determining, the data processing on the data; and switching, according to the data, a power mode of the information processing apparatus between a normal mode in which power is supplied to all components of the information processing apparatus and a power-saving mode in which power supplying is limited to selected components.

Moreover, according to still another aspect of the present invention, there is provided a computer program product including a computer-usable medium having computer-readable program codes embodied in the medium. The program codes when executed cause a computer to execute receiving data from the external network device; determining whether a data processing is needed for the data received at the receiving; performing, when it is determined that the data processing is needed for the data at the determining, the data processing on the data; and switching, according to the data, a power mode of the information processing apparatus between a normal mode in which power is supplied to all components of the information processing apparatus and a power-saving mode in which power supplying is limited to selected components.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a table for explaining conditions for creating a response packet for each of target fields to be detected in the ARP request packet;

FIG. 5 is a schematic diagram for explaining a data structure of a packet internet groper (PING) request packet;

FIG. 8 is a flowchart of packet processing performed by the printer according to the first embodiment:

FIG. 9 is a block diagram of a printer according to a second embodiment of the present invention; and FIG. 10 is a flowchart of packet processing performed by the printer according to the second embodiment.

DETAILED DESCRIPTION OF THE PREFERRED EMBODIMENTS

Exemplary embodiments of the present invention are explained in detail below with reference to the accompanying drawings.

An information-processing apparatus according to a first embodiment of the present invention is connected to a network such as an Ethernet LAN or other LAN, and communicates with an external network device via the network. The information-processing apparatus has a power-mode switching function capable of switching between a normal power mode and a power saving mode. For example, when predetermined conditions are met, the information-processing apparatus can switch from the normal power mode to the power saving mode to reduce power consumption. As an example of the information-processing apparatus, a network-connected printer is explained below.

Figure 1:
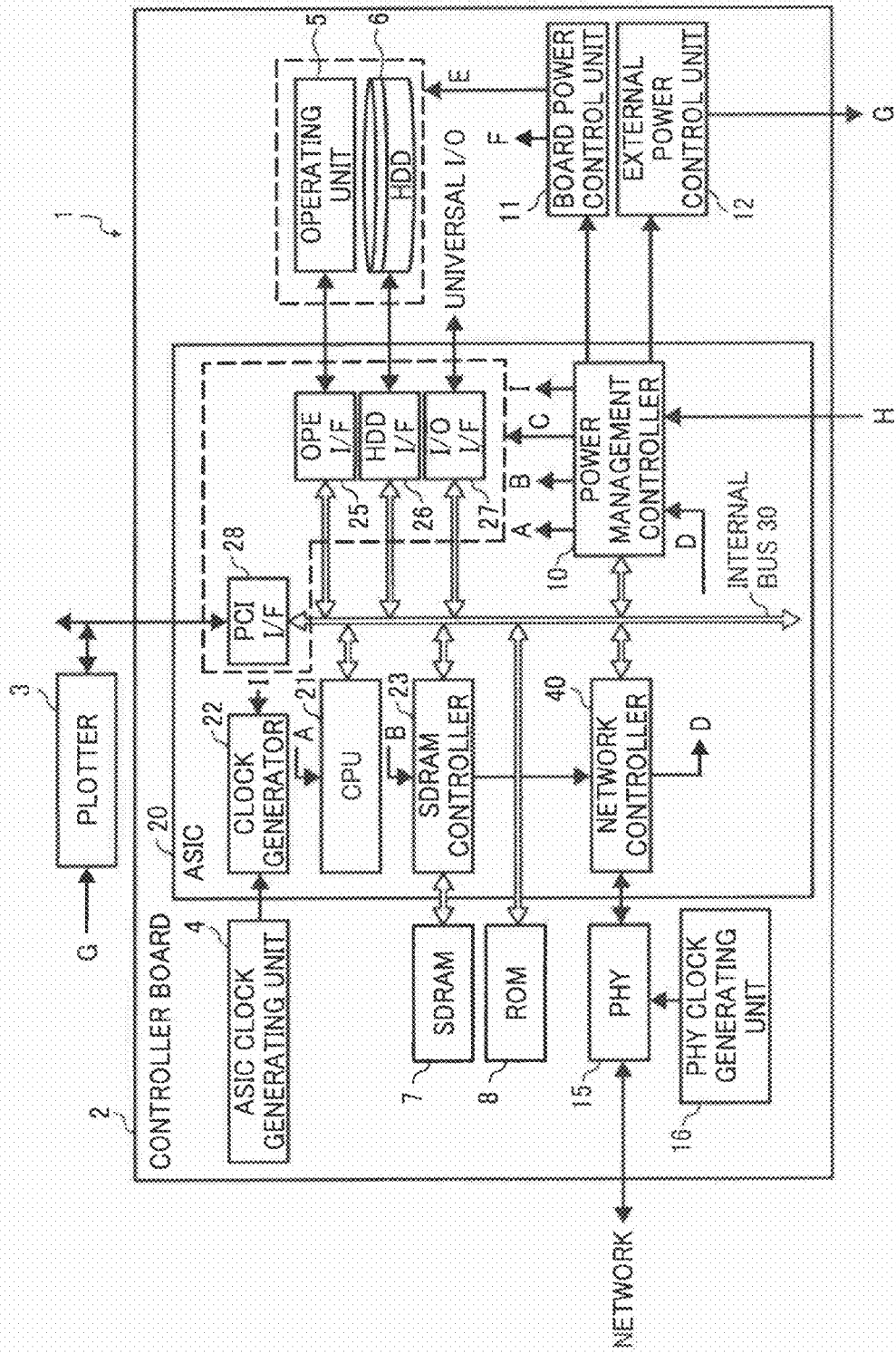
FIG. 1 is a block diagram of a printer according to a first embodiment of the present invention.

FIG. 1 is a block diagram of a printer 1 according to the first embodiment of the present invention. The printer 1 includes a controller board 2 and a plotter 3. The controller board 2 is a control unit for controlling the printer 1. The plotter 3 is a printing unit for performing a print job. Upon receiving a print request from an external network device, the plotter 3 performs a print job under the control of the controller board 2.

The controller board 2 includes an application specific integrated circuit (ASIC) 20 that constitutes a processor, an ASIC clock generating unit 4 that generates a clock and supplies the generated clock to the ASIC 20, an operating unit 5 with which a user performs various operations, a hard disk drive (HDD) 6 for storing therein various data, a synchronous dynamic random access memory (SDRAM) 7 as a working memory, and a read only memory (ROM) 8 as a memory for storing therein computer programs. The controller board 2 further includes a power management controller 10, a board power control unit 11, an external power control unit 12, a physical layer (PHY) 15, and a PHY clock generating unit 16. The power management controller 10 controls power supplying to the printer 1. The board power control unit 11 and the external power control unit 12 are connected to the power management controller 10. The PHY 15 is a network physical layer, and connects the printer 1 to the network. The PHY clock generating unit 16 generates a clock to be supplied to the PHY 15.

The ASIC 20 serves as a main control unit and a data processing unit, and for example, processes data received via the network and data necessary for controlling an operation of each unit in the printer 1. For this purpose, the ASIC 20 includes a central processing unit (CPU) 21 that performs various data processing and calculations, controls the controller board 2, and the like, and a network controller 40 for communicating with an external network device. The ASIC 20 further includes a clock generator 22 to which the ASIC clock generating unit 4 is connected, and an SDRAM controller 23 to which the SDRAM 7 is connected. Moreover, the ASIC 20 includes an operation interface (OPE I/F) 25 for connecting the ASIC 20 to the operation unit 5, an HDD I/F 26 for connecting the ASIC 20 to the HDD 6, an input and output (I/O) I/F 27 for controlling an external I/O, and a PCI I/F 28 for connecting the ASIC 20 to the plotter 3. Furthermore, the ASIC 20 includes an internal bus 30 that connects the above units for enabling data transmission/reception among the units.

The clock generator 22 is a clock frequency changing unit that is controlled by the power management controller 10 to change a frequency (operating frequency) of a clock (clock signal) supplied from the ASIC clock generating unit 4. The clock generator 22 changes the frequency of the clock into a plurality of frequencies, and supplies a clock of each frequency to the ASIC 20 thereby changing a power supply mode thereof.

The SDRAM controller 23 reads out data from the SDRAM 7 and writes data on the SDRAM 7, and also controls a power mode of the SDRAM 7 to switch between a self-refresh mode and a normal power mode (a normal state). Furthermore, the SDRAM controller 23 outputs a signal indicating the power mode of the SDRAM 7, i.e., either the self-refresh mode or the normal power mode, to the network controller 40.

The network controller 40 is a communication control unit for controlling the ASIC 20 (the CPU 21) to communicate with a network-connected external network device via the PHY 15, and includes a media access controller (MAC) for controlling the communication with the external network device. The network controller 40 is connected to the PHY 15 to transmit/receive data with each other to have a function of mediating transmission/reception of data such as a packet (a network packet) to/from the ASIC 20 via the PHY 15 and a network. Accordingly, the network controller 40 serves as a communication unit for communicating with a network-connected external network device together with the PHY 15 and the like.

The power management controller 10 controls power supplying, i.e., controls whether to supply power or stop power supplying to each of the units included in the printer 1, including both the inside and the outside of the ASIC 20, based on control by the CPU 21 via the internal bus 30 and an input signal, i.e., any of signals D and H from other units connected thereto. The input signal D input to the power management controller 10 is any of a plurality of signals output from the network controller 40, including, for example, a signal output when the network controller 40 receives a specific packet or the like. The signal H is any of a plurality of signals input from the outside of the ASIC 20, including, for example, a signal output when a power-mode switching key (not shown) of the printer 1 is pressed.

The power management controller 10 controls power supplying to each of the units in the printer 1 based on the input signals such as the signals D and H, and thereby switching the power modes of the printer 1 and each unit thereof, for example, switching from the normal power mode to the power saving mode or switching from the power saving mode back to the normal power mode. Namely, it can be said that the signals D and H include a signal for switching power modes of the ASIC 20 (the CPU 21) and the SDRAM 7 to the normal power mode, a signal for supplying power or stopping power supplying to each of the controller board 2 and the ASIC 20, and a signal for supplying power or stopping power supplying to the plotter 3. In the present embodiment, the printer 1 is configured to switch the power mode among five different power modes (power consumption modes) that differ in power consumption. The power modes are four different power saving modes and one normal power mode. The four power saving modes differ in the number of the units to be supplied with power. The power management controller 10 controls switching of the power modes. In other words, the power management controller 10 serves as a power-supply control unit that controls switching of the power modes of the printer 1 and each unit thereof. Incidentally, in the present embodiment, the printer 1 has the four power saving modes. However, the number of the power saving modes is not limited to four. Alternatively, the printer 1 can be configured to have five or more power saving modes.

The five power modes of the printer 1 are explained below.

First, the normal power mode is explained. In the normal power mode, all the units included in the printer 1 are supplied with power, i.e., all areas in the printer 1 are energized. Therefore, the CPU 21 and the ASIC 20 are also in a state capable of performing normal operations in the normal power mode. Out of the five power modes, the normal power mode requires the highest power consumption.

Next, a controller mode is explained. The controller mode is a first power saving mode. In the controller mode, all the units included in the controller board 2 are supplied with power, i.e., are energized, and power supplying to only the plotter 3 is shut off to switch the plotter 3 to the power saving state. In the controller mode, therefore, the CPU 21 and the ASIC 20 are in the normal power mode.

Next, a network mode 1 is explained. The network mode 1 is a second power saving mode. In the network mode 1, power supplying to the operating unit 5 and the HDD 6, which are surrounded with a dashed-line frame in the controller board 2 in FIG. 1, and the OPE I/F 25 the HDD I/F 26, the I/O I/F 27, and the PCI I/F 28, which are surrounded with a dashed-line frame in the ASIC 20 in FIG. 1, is shut off in addition to the plotter 3. Other units in the controller board 2 are supplied with power to energize them, and the SDRAM 7 is put into the normal power mode not the power saving mode. The clock generator 22 changes the frequency of the clock to be supplied to the CPU 21 to be lower than that in the normal power mode to switch the CPU 21 to a lower power consumption state, whereby the CPU 21 and the ASIC 20 are switched to the power saving mode having lower power consumption than the normal power mode. Therefore, the network mode 1 requires power consumption lower than that in the controller mode.

Next, a network mode 2 is explained. The network mode 2 is a third power saving mode. In the network mode 2, only the state of the CPU 21 is different from that in the network mode 1, and the power mode state of other units is the same as that in the network mode 1. In the network mode 2, the clock generator 22 changes the frequency of the clock to be supplied to the CPU 21 to be further lower than that in the network mode 1 by the clock generator 22 to switch the CPU 21 to a further lower power consumption state, whereby the CPU 21 and the ASIC 20 are switched to the further power saving mode having lower power consumption than the normal power mode and the network mode 1. Therefore, the network mode 2 requires power consumption lower than that in the controller mode and the network mode 1.

Then, a stand-by mode is explained. The stand-by mode is a fourth power saving mode. In the stand-by mode, only the state of the CPU 21 and the SDRAM 7 is different from that in the network modes 1 and 2, and the power mode state of other units is the same as that in the network modes 1 and 2. Furthermore, the CPU 21 is switched to the sleep mode in which supplying of a clock is stopped, and the SDRAM 7 is switched to the self-refresh mode as the power saving mode. With this operation, the CPU 21 is switched to the stopped state to make the power consumption lower than that in the above other modes. Therefore, out of the five power modes, the stand-by mode requires the lowest power consumption.

Accordingly, the power mode of the CPU 21 and the ASIC 20 can be switched between the normal power mode and the power saving modes having different power consumption, so that power consumption and the state of the CPU 21 and the ASIC 20 are changed in accordance with the power mode of the printer 1. In the present embodiment, the CPU 21 is switched to the sleep mode by stopping supplying of the clock to the CPU 21, and whereby the ASIC 20 including the CPU 21 of this state is switched to the power saving mode (stopped state mode), however, other known methods can be used for switching the ASIC 20 and the CPU 21 to the stopped state. For example, the CPU 21 can be switched to the stopped state by putting the CPU 21 into the sleep mode by causing the frequency of the clock to be supplied to the CPU 21 to be lower than that in the network modes 1 and 2 by the clock generator 22, or by putting the power supply of the CPU 21 into a shut-off state. Namely, the stopped state includes a state of stopping driving of the CPU 21 by shutting off power supplying to the CPU 21, and a state, which is close to the above state, of relatively lowering power consumption of the CPU 21 by limiting the driving thereof while supplying power to the CPU 21.

The switching of the power modes of the printer 1 and each unit thereof such as the CPU 21 is performed by the CPU 21 setting the power mode to the power management controller 10 via the internal bus 30, or by the power management controller 10 based on an input signal such as any of the signals D and H input to the power management controller 10. When the switching of the power modes is performed by the power management controller 10 based on the input signal, the power management controller 10 outputs predetermined signals A, B, C, E, F, G, and I to the corresponding units included in the printer 1 either directly or indirectly.

Specifically, the signal A output from the power management controller 10 is a signal for interrupting the CPU 21 so as to enable the CPU 21 and the ASIC 20 or to switch the CPU 21 and the ASIC 20 to the sleep mode. The signal B is a signal for switching the SDRAM 7 to the self-refresh mode or the normal power mode via the SDRAM controller 23. The signal C is a signal for shutting off power supplying or supplying power to the OPE I/F 25, the HDD I/F 26, the I/O I/F 27, and the PCI I/F 28 in the ASIC 20. The signals E and F are output via the board power control unit 11. The signal E is a signal for shutting off the power supply or supplying the power to the operating unit 5 and the HDD 6. The signal F is a signal for controlling the power supply to the other units on the controller board 2, i.e., the units other than the operating unit 5 and the HDD 6 on the controller board 2. For example, the signal F is output to shut off the power supply for pull-up or to supply the power for pull-up. The signal G is output via the external power control unit 12. The signal G is a signal for controlling the power supply to the outside of the controller board 2. For example, the signal G is output to the plotter 3 so as to control the power supply to the plotter 3.

The signal I is output to the clock generator 22 and is a signal for controlling the clock frequency of the CPU 21. The clock generator 22 changes the frequency of the clock supplied to the CPU 21 in accordance with the request or the like included in the received signal I. Therefore, the power management controller 10 includes a unit for requesting the clock generator 22 to change the clock frequency to change (switch) the power mode of the CPU 21 and the ASIC 20, with which the clock frequency of the CPU 21 is changed thereby controlling power consumption of the CPU 21.

In the present embodiment, as described above, the network controller 40 and the PHY 15 are connected to control data communication with an external network device via the PHY 15 by the network controller 40. Even when the printer 1 is in the power saving mode, power is supplied to the PHY 15 and the network controller 40 so that the network controller 40 processes part of the received data. The received data indicates a packet in the present embodiment, and a packet is taken as an example in the explanation below. Namely, the network controller 40 serves also as a unit for processing a predetermined packet received from the PHY 15 in a predetermined power saving mode. For example, when the ASIC 20 and the CPU 21 are in the power saving mode such as the sleep mode, the network controller 40 can perform predetermined packet processing corresponding to the received packet without intervention of the ASIC 20 and the CPU 21.

Figure 2:
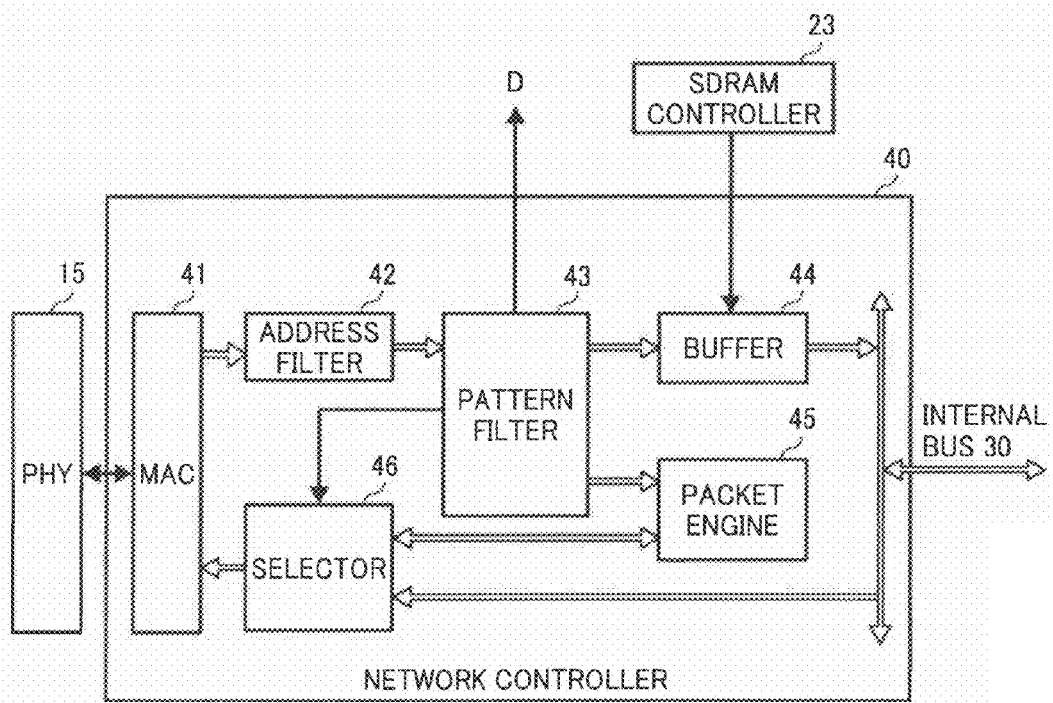
FIG. 2 is a block diagram for explaining a configuration of a network controller of the printer.

FIG. 2 is a block diagram for explaining a configuration of the network controller 40, in which functions, data paths, and the like are schematically illustrated by blocks and arrows.

The network controller 40 includes an MAC 41 for establishing connection with an external network device via the PHY 15, and an address filter 42 and a pattern filter 43 as filter processing units for a received packet. The network controller 40 further includes a buffer 44 that temporarily stores therein the received packet, a packet engine 45, and a selector 46 that switches a data path in the network controller 40.

In the network controller 40, first, the MAC 41 converts a packet received via the PHY 15 into such a format that the address filter 42 can process the packet, and forwards the converted packet to the address filter 42.

The address filter 42 is a packet filtering unit that checks the packet based on an address included in the packet, such as a source MAC address and a destination MAC address, and determines whether to get the received packet therethrough. If the packet meets predetermined conditions, the address filter 42, for example, discards the packet. In the printer 1, the address filter 42 determines a type of the packet received from the MAC 41 (for example, a unicast packet, a broadcast packet, or a multicast packet) based on a destination MAC address or a destination IP address included in the packet, and discards the packet if the packet need not be processed by the network controller 40. If the packet needs to be processed, the packet is forwarded to the pattern filter 43.

The pattern filter 43 performs filtering on the packet based on whether the packet includes a specific pattern. Specifically, the pattern filter 43 scans the packet to check whether the packet includes a specific pattern that has passed the address filter 42 and determines the packet that needs to be processed by the network controller 40. Based on the result of the determination, the pattern filter 43 discards the packet if the packet need not be processed by the network controller 40 and forwards the packet if the packet needs to be processed to the buffer 44 or the packet engine 45 depending upon the type thereof.

As the packet to be processed by the network controller 40, for example, there are a simple network management protocol (SNMP) packet, a request packet for requesting read-out of a stored image, a print request packet, a print-data request packet, an address resolution protocol (ARP) request packet, a packet internet groper (PING) request packet, a file transfer protocol (FTP) packet, and packets for other predetermined protocols. An address allowed for passage and the specific pattern to be scanned, those required for packet filtering by the address filter 42 and the pattern filter 43, are set in a register (not shown), which are read from the register to be used at the time of the packet filtering. Similarly, in addition to the address filter 42 and the pattern filter 43, setting values of the MAC 41 and the packet engine 45 for defining operational conditions or the like can be set by the CPU 21. The network controller 40 performs each processing described below based on the settings values.

When a received packet is one to be processed by the network controller 40 and also is a predetermined packet that a response to which is relatively simple, such as an ARP request packet, or a PING request packet, the network controller 40 forwards the packet from the pattern filter 43 to the packet engine 45. At the same time, the pattern filter 43 outputs a signal to the selector 46 for requesting the selector 46 to select a packet from the packet engine 45 as a packet to be passed to the MAC 41.

The selector 46 is a selection unit that selects any of a packet from the packet engine 45 and a packet sent via the internal bus 30 and forwards the selected packet to the MAC 41. The selector 46 normally selects the packet from the internal bus 30. The selector 46 is capable of switching a packet as a target to be selected by a signal from the pattern filter 43. For example, the selector 46 is switched to select a packet from the packet engine 45 by the signal that is sent from the pattern filter 43 at the time when the received packet is the ARP request packet or the PIG request packet.

In this state, the packet engine 45 creates a response packet corresponding to a type of the received packet and the like. For example, the packet engine 45 creates an ARP response packet for the ARP request packet and a PING response packet for the PING request packet. Thereafter, the packet engine 45 forwards the created response packet to the selector 46 to be transmitted onto the network via the MAC 41 and the PHY 15. In this manner, the network controller 40 automatically responds to the packet with high frequency of reception such as the ARP request packet or the PING request packet without intervention of the CPU 21. For example, when the CPU 21 is in the sleep mode, that is, in the low power consumption state, the network controller 40 responds to a packet without switching the CPU 21 back to the normal power mode.

In a transmission control protocol (TCP)-based network communication, the TCP is not specified to respond a packet easily. Therefore, the pattern filter 43 determines whether a received packet is a predetermined protocol packet, i.e., a packet requiring to send one response packet with respect to the one packet, such as an ARP request packet, a PING request packet, and an SNMP packet as described above. When the received packet is the predetermined protocol packet, the pattern filter 43 detects a specific value from a field in the packet. The packet engine 45 just sends a response packet corresponding to the value detected by the pattern filter 43. Therefore, it is possible to respond to the packet with such a simple operation.

Figure 3:
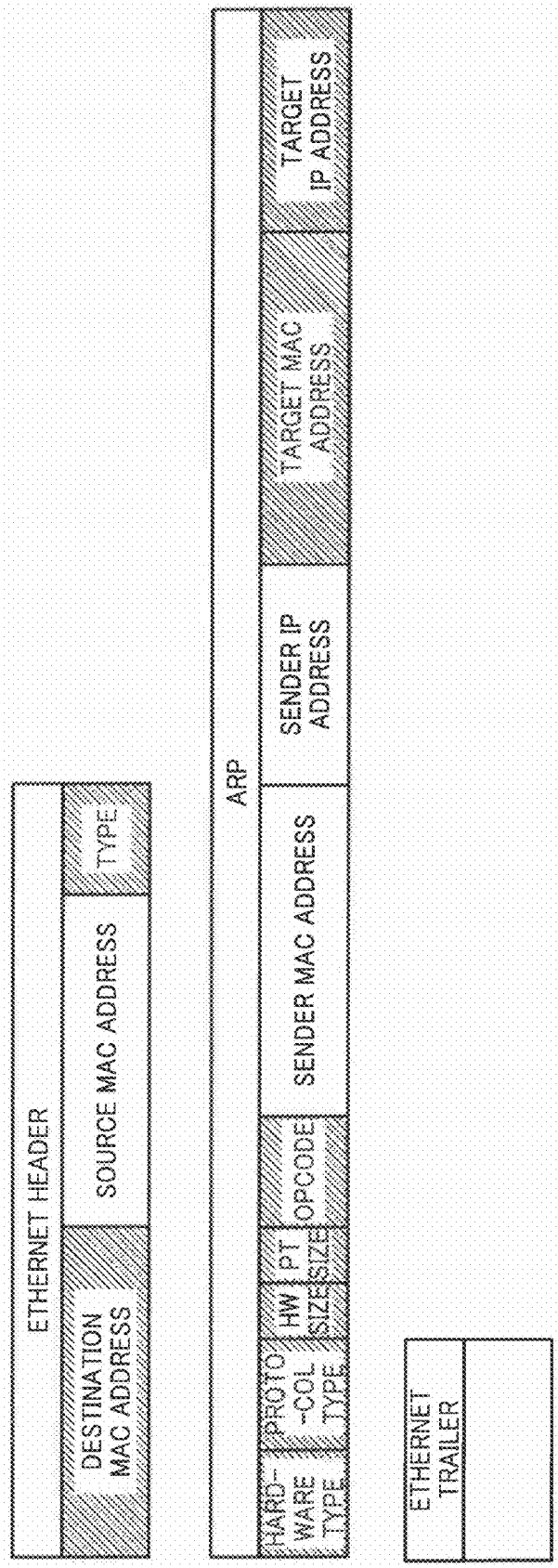
FIG. 3 is a schematic diagram of a data structure of an address resolution protocol (ARP) request packet.

How the pattern filter 43 determines a received packet as an ARP request packet is explained in detail below as one example. FIG. 3 is a schematic diagram for explaining a data structure of an ARP request packet.

The pattern filter 43 detects a value of a "DESTINATION MAC ADDRESS" field and a value of a "TYPE" field from an "ETHERNET HEADER" of the ARP request packet. Then, the pattern filter 43 detects a value of a "HARDWARE TYPE" field, a value of a "PROTOCOL TYPE" field, a value of a "HARDWARE (HW) SIZE" field, a value of a "PROTOCOL (PT) SIZE" field, a value of an "OPCODE" field, a value of a "TARGET MAC ADDRESS" field, and a value of a "TARGET IP ADDRESS" field from an "ARP" of the ARP request packet.

FIG. 4 is a table for explaining conditions for creating a response packet for each of the fields as targets to be detected in the ARP request packet. The pattern filter 43 determines whether the detected value of each of the fields meets the corresponding conditions shown in FIG. 4. When the detected value meets the corresponding conditions, the pattern filter 43 determines that the packet needs to be processed, and the packet engine 45 creates a response packet.

In this manner, the series of processes to be performed when the network controller 40 receives a packet to which the network controller 40 can respond from the PHY 15 are complete.

At this time, the MAC 41, the filters 42 and 43, the packet engine 45, and the like of the network controller 40 have a function of determining whether the packet needs to be processed in the network controller 40, and a function of discarding the packet when it is determined that the packet need not be processed in the network controller 40, in accordance with a type of the received packet or the like. In addition, the MAC 41, the filters 42 and 43, the packet engine 45, and the like of the network controller 40 have a function (the pattern filter 43) of determining whether the network controller 40 can process the packet when it is determined that the packet needs to be processed in the network controller 40, a function of creating a response packet corresponding to the type of the packet or the like when it is determined that the network controller 40 can process the packet, and a function of forwarding the created response packet to the network via the PHY 15.

For example, when a received packet is a PING request packet, and the PING request packet is fragmented, if the network controller 40 does not have a memory with a storage capacity corresponding to at least a size of the PING request packet before being fragmented (for example, 64 kilobytes (KB)), the network controller 40 cannot process the PING request packet. Therefore, in this case, the packet engine 45 determines that the fragmented PING request packet is to be processed by the CPU 21.

How the packet engine 45 determines whether a PING request packet is fragmented is explained below. FIG. 5 is a schematic diagram for explaining a data structure of a PING request packet.

The packet engine 45 detects a value of a "DESTINATION MAC ADDRESS" field and a value of a "TYPE" field from an "ETHERNET HEADER" of the PING request packet. The packet engine 45 detects a value of a "VERSION" field, a value of a "HEADER SIZE" field, a value of a "SERVICE" field, a value of a "FLAGS" field, a value of a "FRAGMENT OFFSET" field, a value of a "PROTOCOL" field, and a value of a "DESTINATION IP ADDRESS" field from an "IP HEADER" of the PING request packet. Then, the packet engine 45 detects a value of a "TYPE" field from an "ICMP" of the PING request packet.

Figures 6, 7:
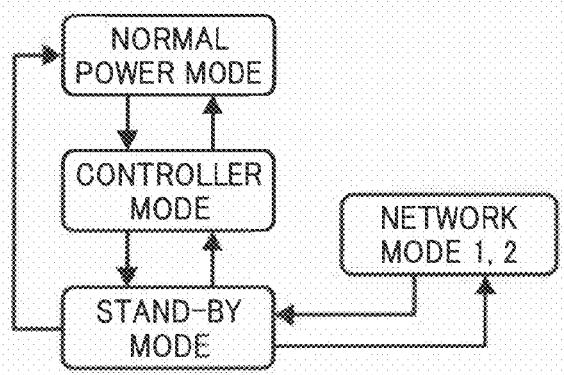
FIG. 6 is a table for explaining conditions for the PING request packet for each of target fields to be detected in the PING request packet.
FIG. 7 is a schematic diagram for explaining switching of power modes of the printer.

FIG. 6 is a table for explaining conditions for the PING request packet by each of the fields included in the PING request packet to be detected by the packet engine 45. When both the detected values of the "FLAGS" field and the "FRAGMENT OFFSET" field in the "IP HEADER" are not zero, the packet engine 45 determines the PING request packet as a fragmented packet.

In this manner, the network controller 40 performs predetermined packet processing, including an analysis of a received packet, a discard of the received packet, and an output of a response packet with respect to the received packet.

When the pattern filter 43 determines that the packet cannot be processed, i.e., when the packet to be processed is not a packet of which response packet can be created, the network controller 40 forwards the packet to the buffer 44 to be stored therein. At this time, the network controller 40, while being notified by the SDRAM controller 23 that the SDRAM 7 is in the normal power mode, immediately forwards the stored packet from the buffer 44 to the SDRAM 7 via the SDRAM controller 23 to be stored therein. When being notified by the SDRAM controller 23 that the SDRAM 7 is in the self-refresh mode, the packet stored in the buffer 44 is kept therein until being notified that the SDRAM 7 is switched back to the normal power mode. Thereafter, the network controller 40, after the SDRAM 7 is returned to the normal power mode, forwards the stored packet from the buffer 44 to the SDRAM 7 via the SDRAM controller 23 and stores the packet in the SDRAM 7.

When the packet is forwarded to the buffer 44, the pattern filter 43 outputs the predetermined device reactivation signal D to the power management controller 10 to cause the CPU 21 to process the received packet to thereby cause the printer 1 to perform a process corresponding to the packet. The device reactivation signal D is a signal for requesting switching of the power mode, including switching the ASIC 20 and the controller board 2, from the power saving mode to the normal power mode. The device restoring signal D is added with a different power mode switching request depending upon a type of a packet to be processed, for example, a packet requiring operations of the plotter 3, the operating unit 5, and the HDD 6, or a packet requiring the operation of the ASIC 20 only.

At this time, for example, when the received packet is a print request packet for requesting printing of printing data by the plotter 3, the pattern filter 43 outputs the signal D including a reactivation request for the plotter 3 (a plotter reactivation request) to the power management controller 10. The power management controller 10 outputs a signal corresponding to the present power mode of the printer 1 by the signal D. For example, when the printer 1 is in the controller mode, the power management controller 10 outputs a signal to the external power control unit 12 to cause the signal G shown in FIG. 1 to be output to the plotter 3. Power is supplied to the plotter 3 by the signal G to switch the plotter 3 from the power saving mode to the normal power mode.

When the received packet is, for example, a request packet for requesting read-out of images stored in the HDD 6, the pattern filter 43 outputs the signal D including a reactivation request for the controller board 2 (a controller reactivation request) to the power management controller 10. For example, when the printer 1 is in the network mode 2, the power management controller 10 outputs the signal C and the signal E via the board power control unit 11 by the signal D.

Power is supplied to each of the OPE I/F 25, the HDD I/F 26, the I/O I/F 27, the PCI I/F 28, the operating unit 5, and the HDD 6 to cause them to be in the operating state by the signals C and E. Therefore, the HDD I/F 26 and the HDD 6 are switched from the power saving mode to the normal power mode while keeping the plotter 3 in the power saving mode. At the same time, the power management controller 10 outputs the signal I to the clock generator 22 to control changing of the clock frequency, and the clock frequency of the CPU 21 is increased, thereby switching the power mode of the printer 1 to the controller mode.

When the printer 1 receives, for example, a management information base (MIB) request packet in the stand-by mode, the pattern filter 43 outputs the signal D including a reactivation request for the CPU 21 (a CPU reactivation request) to the power management controller 10. The power management controller 10 outputs the signals A and B, and the signal I for controlling the clock frequency by the signal D, and switches the power mode of the CPU 21 and the SDRAM 7 while keeping the plotter 3, part of the controller board 2, and part of the ASIC 20 in the power saving mode. At this time, the CPU 21 is caused to operate with lower power consumption and at a lower clock frequency than those in the network mode 1 to switch the CPU 21 to the power saving state (power saving mode), and the SDRAM 7 is caused to switch from the self-refresh mode in the power saving state to the normal power mode in the normal operation state. In response to this, the power mode of the printer 1 is switched to the network mode 2, and the CPU 21 performs predetermined packet processing.

As above, the power management controller 10 serves as a power controlling unit that, when the pattern filter 43 determines that a received packet needs to be processed, controls switching of the power mode of the CPU 21 or the ASIC 20 depending upon a type of the packet or the like. For example, upon receiving a packet when the CPU 21 or the ASIC 20 is in any of the power saving modes, the power management controller 10 supplies power to the CPU 21 or changes the clock frequency of the CPU 21 to switch from the power saving mode to the high-power consumption power mode (other power saving modes or the normal power mode), depending upon the received packet.

The power management controller 10 serves as a power mode switching unit for switching the power mode of the CPU 21, the ASIC 20, or the like depending upon the packet to be processed together with the pattern filter 43 and the like, so that the printer 1 switches the power mode of the CPU 21, the ASIC 20, or the like to any of the power modes having different power consumption including the normal power mode and the power saving modes. Specifically, in the printer 1, the pattern filter 43 analyzes a received packet, a signal for requesting switching of the power mode is output to the power management controller 10 based on the result of the analysis, and the packet processing is performed after switching the power mode of the CPU 21, the ASIC 20, or the like.

In the present embodiment, the pattern filter 43 serves as a unit for determining a type of a packet to be processed such as a protocol and a request content, and as a unit for requesting the power management controller 10 to switch the power mode of the CPU 21, the ASIC 20, or the like to the power mode corresponding to the type of the packet based on the result of the determination by outputting a signal to the power management controller 10. In response to the request from the pattern filter 43, the power management controller 10 controls and switches the power mode of each unit in the printer 1 in accordance with a type of each packet to be processed (e.g., switching the power mode of the CPU 21 so that the CPU 21 can perform appropriate packet processing), and then causes each unit to perform processing. At this time, when receiving, for example, a packet that the printer 1 receives frequently and that is easy to process or a packet of which process time is short, the power management controller 10 changes the clock frequency of the CPU 21 to be lower than that at the time of receiving other packets. Therefore, the CPU 21 is switched to the power saving mode in which data processing speed is slow, however, power consumption is relatively low (e.g., a state in the network mode 2), and then processes a received packet.

Subsequently, the switching of the power modes of the printer 1 is concretely explained below.

FIG. 7 is a schematic diagram for explaining the switching of the power modes of the printer 1.

First, the switching between the normal power mode and the controller mode is explained below.

The switching from the normal power mode to the controller mode is made, for example, when the plotter 3 is not in operation for a predetermined time period, or the power-mode switching key is pressed. For example, when the CPU 21 detects that the plotter 3 is not in operation for the predetermined time period, the CPU 21 causes the power management controller 10 to shut off the power supply to the plotter 3. The power management controller 10 outputs the signal G via the external power control unit 12 thereby shutting off the power supply to the plotter 3, whereby the printer 1 is switched from the normal power mode to the controller mode.

Conversely, the switching from the controller mode to the normal power mode is made, for example, when the printer 1 receives print data or a print request from a network-connected external network device, or the power-mode switching key is pressed. For example, when the printer 1 receives print data from an external network device, the pattern filter 43 of the network controller 40 outputs the device reactivation signal D including the plotter reactivation request to the power management controller 10. At the same time, the print data stored in the buffer 44 is forwarded to the SDRAM 7 via the SDRAM controller 23 to be stored therein. Then, the CPU 21 processes the print data and forwards the processed print data to the plotter 3. The plotter 3 prints out the print data on a sheet.

The switching from the controller mode to the stand-by mode is made when no event occurs for a predetermined time period, for example, when the printer 1 does not receive any packet to be processed by the CPU 21 via the network for the predetermined time period, and the power-mode switching key is not pressed for the predetermined time period, and also there is no input to the operating unit 5 for the predetermined time period. For example, when the CPU 21 confirms that no event occurs for the predetermined time period, the CPU 21 causes the power management controller 10 to switch the CPU 21 to the sleep mode; the SDRAM 7 to the self-refresh mode; and a part of the controller board 2 and a part of the ASIC 20 to the power saving mode. The power management controller 10 outputs the signals A, B and C and the signals E and F via the board power control unit 11 thereby switching the CPU 21 to the sleep mode; the SDRAM 7 to the self-refresh mode; and the part of the controller board 2 and the part of the ASIC 20 (each of which is surrounded with a dashed-line frame in FIG. 1) to the power saving mode, whereby the printer 1 is switched from the controller mode to the stand-by mode.

Conversely, the switching from the stand-by mode to the controller mode is made, for example, when the printer 1 receives a request packet for requesting read-out of image data stored in the HDD 6 from an external network device. At this time, the pattern filter 43 outputs the device reactivation signal D including the controller reactivation request to the power management controller 10. Upon receiving the device reactivation signal D not including the plotter reactivation request, the power management controller 10 outputs the signal A thereby switching the CPU 21 from the sleep mode to the normal power mode, outputs the signal B thereby switching the SDRAM 7 from the self-refresh mode to the normal power mode and outputs the signal C thereby switching the part of the controller board 2 from the self-refresh mode to the normal power mode. Furthermore, the power management controller 10 outputs the signals E and F via the board power control unit 11 thereby switching a part of the controller board 2, such as the HDD 6, and a part of the ASIC 20 from the power saving mode to the normal power mode. At the same time, part of the controller board 2 such as the HDD 6 and part of the ASIC 20 (each of which is surrounded with a dashed-line frame in FIG. 1) are switched from the power saving state to the normal state to switch the printer 1 to the controller mode. In this state, for example, an image read-out request packet of images stored in the buffer 44 is forwarded to the SDRAM 7 to be stored therein in the same manner as the above. Then, the CPU 21 reads out the requested image data from the HDD 6, and transmits the image data to the external network device connected via the network.

The switching from the stand-by mode to the normal power mode is made, for example, when the printer 1 receives print data or a print request from an external network device, or the power-mode switching key is pressed. At this time, for example, when receiving the print data from the external network device, the pattern filter 43 outputs the device reactivation signal D including the plotter reactivation request to the power management controller 10. Upon receiving the device reactivation signal D including the plotter reactivation request, the power management controller 10 outputs the signal A thereby switching the CPU 21 from the sleep mode to the normal power mode, and outputs the signal B thereby switching the SDRAM 7 from the self-refresh mode to the normal power mode. The power management controller 10 switches the part of the controller board 2 and the part of the ASIC 20 from the power saving state to the normal state by the signal C, and the signals E and F via the board power control unit 11. Moreover, the plotter 3 is supplied with power by the output of the signal G via the external power control unit 12, so that the plotter 3 is switched from the power saving mode back to the normal power mode, whereby the printer 1 is switched from the stand-by mode to the normal power mode. After that, the printer 1 forwards the print data stored in the buffer 44 to the SDRAM 7. Then, the CPU 21 processes the print data and forwards the processed print data to the plotter 3. The plotter 3 prints out the print data on a sheet.

Next, the switching between the stand-by mode and the network mode is explained below.

The switching from the stand-by mode to the network mode 1 is made, for example, when the printer 1 receives a packet for data transfer to the external network device such as an FTP packet, or a packet that needs to establish connection with a transmission source of the packet such as a TCP packet. At this time, the pattern filter 43 outputs the device reactivation signal D including the CPU reactivation request to the power management controller 10. Based on the signal D, the power management controller 10 outputs the signals A, B, and I thereby switching the CPU 21 from the sleep mode to the power saving mode having lower clock frequency and power consumption than the normal power mode and switching the SDRAM 7 from the self-refresh mode to the normal power mode. Therefore, the power mode of the printer 1 is switched to the network mode 1, and a packet stored in the buffer 44 such as an FTP packet is forwarded to the SDRAM 7, which is processed by the CPU 21 to transmit corresponding data such as a packet to an external network device. In this manner, in the network mode 1, packet processing and data transfer can be performed in a state in which power consumption is lower than in the normal power mode and the controller mode and processing speed is faster than in the network mode 2 to respond to each network protocol.

The switching from the stand-by mode to the network mode 2 is made, for example, when the printer 1 receives an MIB request packet or a user datagram protocol (UDP) packet. At this time, the pattern filter 43 outputs the device reactivation signal D including the CPU reactivation request to the power management controller 10. Based on the signal D, the power management controller 10 outputs the signals A, B, and I thereby switching the CPU 21 from the sleep mode to the power saving mode having lower clock frequency and power consumption than the network mode 1 and switching the SDRAM 7 from the self-refresh mode to the normal power mode. Therefore, the power mode of the printer 1 is switched to the network mode 2, and a packet stored in the buffer 44 such as an MIB packet is forwarded to the SDRAM 7, which is processed by the CPU 21 to transmit a response packet to an external network device. In this manner, in the network mode 2, packet processing and transmission of a response packet can be performed in a state in which power consumption is suppressed low although speed processing is slow compared with those in the network mode 1 to respond to each network protocol.

The switching from each network mode to the stand-by mode is made, for example, when the CPU 21 completes processing on each received packet after the printer 1 is switched from the stand-by mode to each network mode. At this time, for example, when the CPU 21 confirms completion of the packet processing, the CPU 21 causes the power management controller 10 to switch the CPU 21 to the sleep mode and the SDRAM 7 to the self-refresh mode. The power management controller 10 outputs the signals A and B thereby switching the CPU 21 to the sleep mode and the SDRAM 7 to the self-refresh mode, whereby the printer 1 is switched from each network mode to the stand-by mode.

Accordingly, the power management controller 10 serves as a unit for switching the printer 1 between the power modes as well as serves as a unit for switching each unit of the printer 1 to the power mode having lower power consumption under the condition of completion of processing each received packet by the CPU 21. However, for example, when a packet to be processed by the CPU 21, which is received in the network mode 1, is a packet that needs to establish and keep connection with an external network device of a transmission source, the power management controller 10 does not switch the power mode of the printer 1 immediately after processing each received packet. In such case, the power management controller 10 switches the power mode of the CPU 21 and the like to the power mode having lower power consumption under the condition of cutting off the connection with the network device or elapse of a predetermined time period in a non-communication state such as there is no communication for a certain period of time from the network device after the last reception of a packet from the network device.

In the similar manner, when a packet to be processed by the CPU 21 is a packet for performing data transfer in a plurality of packets, for example, a packet for a protocol for transmitting data by dividing the data into a plurality of packets, the power management controller 10 performs switching of the power mode after completion of a series of packet processing.

As such packet, for example, there are a print-data packet, a scan data transfer packet, a FTP packet, a trivial file transfer protocol (TFTP) packet, and the like. When receiving and processing such packet, each packet needs to be processed fast by increasing transfer speed, processing speed, or the like.

For this purpose, the power management controller 10, when receiving such packet, switches to the power mode having higher power consumption than that for processing a packet of other types such as a packet for a protocol for transmitting data in one packet. Therefore, the power management controller 10 switches the power mode of the CPU 21 to one in which power consumption is relatively large and the clock frequency is high (i.e., processing speed is fast) among the power modes. In this state, the CPU 21 processes the packet, enabling to improve efficiency in processing a print data packet or a scan data transfer packet, or data transfer, which can thus be completed promptly.

As above, the power management controller 10 serves as a unit for switching the power mode and switches the power mode of the CPU 21 or the printer 1 to the appropriate one depending upon a type of a packet to be processed, processing conditions, and the like. In the printer 1, the CPU 21 is switched from the stopped state such as the sleeping mode not only to the normal power mode but also to a state having lower power consumption than the normal operating state for performing packet processing to reduce power consumption. In other words, the power management controller 10 serves as a unit that, when receiving a packet in a state where the CPU 21 and the ASIC 20 are in the stopped state, switches the power mode of the CPU 21 and the ASIC 20 to any of the power saving modes having lower power consumption than the normal power mode depending upon the received packet. In addition to the normal power mode, the printer 1 can cause the CPU 21 in such state to process a received packet.

Information processing performed by the printer 1, including packet processing on a received packet with switching the CPU 21 or the like between the normal power mode and the power saving mode is explained below. FIG. 8 is a flowchart of the packet processing performed by the printer 1.

Depending upon the conditions as explained above with reference to FIG. 7, the power mode of the printer 1 is switched, for example, from the normal power mode to the controller mode or the stand-by mode (Step S101).

It is determined whether the printer 1 receives a packet via the network and the PHY 15 (Step S102). When the printer 1 does not receive any packet (NO at Step S102), the printer 1 stands by until the printer 1 receives a packet. When the printer 1 receives a packet while in the stand-by state (YES at Step S102), each of the address filter 42 and the pattern filter 43 determine whether the received packet needs to be processed depending upon the received packet (Step S103). When it is determined that the received packet need not be processed (NO at Step S103), the network controller 40 discards the received packet (Step S104). The process control returns to Step S102, and the printer 1 stands by for a next packet.

On the other hand, when it is determined that the received packet needs to be processed (YES at Step S103), the pattern filter 43 further determines whether the network controller 40 can process the received packet without intervention of the CPU 21 (Step S105). When it is determined that the network controller 40 can process the received packet (YES at Step S105), the packet engine 45 creates a response packet corresponding to the received packet while keeping its power mode (Step S106). The network controller 40 transmits the response packet onto the connected network via the PHY 15 (Step S107). The process control returns to Step S102, and the printer 1 stands by for a next packet.

On the other hand, when it is determined that the network controller 40 cannot process the received packet (NO at Step S105), the printer 1 is switched to the power mode in which the ASIC 20 or the CPU 21 processes the received packet (Step S108).

Specifically, the network controller 40 outputs the signal D to the power management controller 10, and thereby causing the power management controller 10 to switch the power mode of the printer 1, for example, from the stand-by mode to any of the power saving modes or the normal power mode. In this manner, the power mode of the printer 1 or each unit thereof such as the CPU 21 is switched between the normal power mode and the power saving modes having different power consumption. More specifically, the pattern filter 43 determines a type of a packet to be processed, and the power mode of the CPU 21 is switched to the one corresponding to the type of the packet such as by changing the clock frequency under the control by the power management controller 10.

After the power mode is switched, the CPU 21 performs a corresponding process on the packet depending upon a type and a request content of the received packet, for example, forwarding or printing out image data (Step S109). When the packet processing by the CPU 21 is complete (YES at Step S110), the process control returns to Step S101, and the power mode of the printer 1 is switched, for example, to the power mode having lower power consumption such as the stand-by mode when the predetermined conditions are met as above.

As described above, when the printer 1 receives a packet in a state where the CPU 21 or the printer 1 is in the power saving mode, the CPU 21 or the printer 1 is switched from the power saving mode to, for example, a power mode having higher power consumption depending upon the received packet to process the packet, and thereafter, the power mode is switched to one having lower power consumption. When the packet to be processed is a packet that needs to keep connection with a transmission source of the packet, the power mode is switched to one having lower power consumption after cutting off the connection or after elapse of a predetermined time period in a non-communication state with the transmission source. When a packet to be processed is a packet for a protocol for performing data transfer in a plurality of packets, the power mode is switched to one having higher power consumption than the power mode for processing a packet of other types such as a packet for a protocol for transmitting data in one packet. Furthermore, as described above, upon reception of a packet when the CPU 21 or the like is in the stopped state, the power mode of the CPU 21 or the like in the stopped state is switched to the power mode having lower power consumption than the normal power mode depending upon the received packet, thereby reducing power consumption.

In the first embodiment, when it is determined that the network controller 40 can process a packet, the packet engine 45 creates a response packet. In a second embodiment of the present invention, even when it is determined that a network controller 940 can process a packet, it is further determined whether the packet is to be processed by the network controller 940.

FIG. 9 is a block diagram of a printer 900 according to the second embodiment of the present invention. The printer 900 includes a controller board 920 instead of the controller board 2 in the first embodiment. The controller board 920 includes the network controller 940 of which function is different from the network controller 40 of the controller board 2. The components other than the network controller 940 are the same as those in the first embodiment, so that the same components are denoted by the same reference numerals as those in the first embodiment.

The network controller 940 determines whether the network controller 940 can process a packet in the same manner as the network controller 40. When it is determined that the network controller 940 can process the packet, the network controller 940 further determines whether the packet is to be processed by the network controller 940 without intervention of the CPU 21. When it is determined that the packet is to be processed by the network controller 940, the packet engine 45 creates a response packet. On the other hand, when it is determined that the packet is not to be processed by the network controller 940, the network controller 940 instructs to switch the power mode of the CPU 21 to the normal power mode and causes the CPU 21 to process the packet.

Even though the network controller 940 can process a packet, the network controller 940 does not process the packet, for example, when the packet engine 45 includes a CPU with a lower processing capability than the CPU 21. The CPU of the packet engine 45 performs a process relevant to packet processing, such as a creation of a response packet, by executing a computer program stored in a ROM included in the network controller 940. Furthermore, for example, when a received packet is encrypted, and the encrypted packet is to be decrypted, the network controller 940 can decrypt the packet by causing the CPU of the packet engine 45 to execute a decryption program. However, in this case, a processing speed is not fast.

The CPU 21 has a higher processing capability than the CPU of the packet engine 45, so that the CPU 21 can decrypt the packet with a cryptography engine included in the CPU 21 at high speed. Therefore, the network controller 940 determines that the network controller 940 does not decrypt the packet, and forwards the encrypted packet to the CPU 21.

Incidentally, in the present embodiment, when the network controller 940 determines not to process a packet, the CPU 21 creates a response packet. Alternatively, when the network controller 940 determines not to process a packet, for example, it can be configured not to create or transmit a response packet.

For example, there is a case where it is not necessary to return a response packet with respect to a packet received from a sender with a specific IP address. Therefore, the network controller 940 can be configured to create a response packet with respect to only a predetermined packet, such as a PING request packet, an ARP request packet, and the like, and also configured to neither perform processing in the CPU 21 nor create a response packet with respect to a packet received from the sender with the specific IP address.

Subsequently, packet processing performed by the printer 900 is explained below. FIG. 10 is a flowchart of the packet processing performed by the printer 900.

Procedures at Steps S201 to S205 are identical to those at Steps S101 to S105 in FIG. 8, and the description of those Steps is omitted. When it is determined that the network controller 940 can process a packet (YES at Step S205), the network controller 940 further determines whether to process the packet (Step S206).

When the network controller 940 determines to process the packet (YES at Step S206), the packet engine 45 creates a response packet with respect to the received packet in the similar manner to the first embodiment (Step S207). The network controller 940 transmits the response packet onto the connected network via the PHY 15 (Step S208). The process control returns to Step S202, and the printer 900 stands by for a next packet in the stand-by mode.

On the other hand, when the network controller 940 determines not to process the packet (NO at Step S206), the printer 900 is switched from the stand-by mode to the power mode so that the CPU 21 can perform a first packet processing on the received packet (Step S209). Procedures at Steps S210 and S211 are identical to those at Steps S109 and S110 in FIG. 8, and the description of those Steps is omitted.

In this manner, in the present embodiment, even when the network controller 940 determines that the network controller 940 can process a packet, the network controller 940 further determines whether to process the packet the network controller 940. Therefore, packet processing can be performed more efficiently. Especially, if the network controller 940 is composed of software, the network controller 940 determines not to process a packet requiring a high processing capability, and causes the CPU 21 having the high processing capability to process the packet. Therefore, the packet processing can be performed at high speed.

Namely, a method for packet processing performed by any of the printers 1 and 900 as examples of the information-processing apparatus according to the present invention can be written in a general program language into a computer program enabling a computer to execute the packet processing. Furthermore, the computer program can be stored in any computer-readable recording medium, such as a flexible disk (FD), a compact disk read-only memory (CD-ROM), a digital versatile disk read-only memory (DVD-ROM), or magneto-optical (MO) disk, so that a computer can read the computer program from the recording medium.

Accordingly, when the printer 1 or 900 receives a packet via a network while in a predetermined power saving mode, it is determined that the received packet need not be processed, and part of packet processing such as discard of a packet and transmission of a response packet can be performed without intervention of the CPU 21 or the like. Therefore, it is not necessary to switch the CPU 21 or the like to the normal power mode every time the printer 1 or 900 receives a packet. Thus, upon reception of a packet, it can be suppressed that the printer 1 or 900 in the power saving mode is switched to the normal power mode, enabling to keep each unit of the printer 1 or 900 such as the CPU 21 and the ASIC 20 in the power saving mode for a longer time.

The printer 1 or 900 can receive a packet while keeping the power saving mode, so that the printer 1 or 900 can keep the low power consumption state for a long time compared with a conventional case. Therefore, power consumption of the printer 1 or 900 can be reduced. Moreover, depending upon a type of a packet received in the power saving mode or the like, the power mode of the ASIC 20 (CPU 21) that serves as a data processing unit of the printer 1 or 900 is switched to the one appropriate for processing the packet in consideration of processing efficiency, power consumption, and the like. Namely, the power mode of the CPU 21 or the like is switched to the one appropriate for a packet to be processed among a plurality of power modes having different power consumption (in the above embodiments, the normal power mode and the power saving modes), and processes the packet in an optimum state. Therefore, each packet can be processed while following each protocol and keeping power consumption low, enabling to reduce unnecessary power consumption for processing a packet or the like, which results in reducing power consumption of the printer 1 or 900.

Moreover, in the printer 1 or 900, the power mode of the CPU 21 or the like is switched to one having lower power consumption after completing processing on a received packet, so that unnecessary power consumption can be eliminated thereby further reducing power consumption. Accordingly, the power mode of the CPU 21 or the like is switched between power modes including the power saving modes depending upon a packet to be processed, so that a packet can be processed in the power mode appropriate for the packet, enabling to reduce power consumption.

When a packet to be processed is a packet that needs to keep connection with a network device after establishing the connection therewith, the printer 1 or 900 transmits/receives a packet to/from the network device frequently. In this case, if the power mode is switched to one having lower power consumption for each packet processing, processing speed may decrease due to the overhead by the switching. In such case therefore, it is preferable to keep the power mode of the CPU 21 without switching to, for example, the sleep mode even after processing a packet. This can eliminate the overhead due to the switching of the power mode, thereby efficiently preventing processing speed from decreasing. The power mode of the CPU 21 or the like is switched to one having lower power consumption after cutting off the connection or elapse of a predetermined time, so that power consumption can be further reduced.

Furthermore, the CPU 21 or the like is switched from the stopped state to the power saving mode having lower power consumption than the normal power mode to perform packet processing, so that the packet can be processed while keeping the CPU 21 in the lower power consumption state, enabling to sufficiently exert the effect of the power saving mode. At this time, if the CPU 21 is put into the stopped state by shutting off the power supply of the CPU 21, power consumption can be reduced significantly. If the CPU 21 is put into the sleep mode or into the stopped state by stopping supplying a clock, it is possible to shorten the time required for switching from the present state to the normal power mode or the like while reducing power consumption.

The network controller 40 or 940 can perform packet filtering and discard unnecessary packet regardless of the power mode of the printer 1 or 900. With this configuration, the load on the CPU 21 or the like can be reduced, thereby improving data processing efficiency of the printer 1.

Moreover, the clock generator 22 is provided to change the frequency of the clock supplied to the CPU 21 thereby switching the power mode of the CPU 21. Alternatively, for example, a unit for changing voltage of power to be supplied to the CPU 21 can be provided to switch the power mode. With this configuration, the voltage of the power is controlled to change by the power management controller 10 and is supplied to the CPU 21, thereby switching the power mode of the CPU 21. Still alternatively, both of the clock generator 22 and the unit for changing the voltage can be provided. With this configuration, both of the frequency of the clock and the voltage of the power to be supplied to the CPU 21 are controlled to change, thereby switching the power mode of the CPU 21. When the power mode is switched by combining a clock frequency control and a voltage control, power consumption can be reduced more efficiently.

In the above, the information processing apparatus is explained by taking an example of processing a packet received via a network. However, the information processing apparatus can employ other examples such as receiving various data other than a packet and processing the data.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus configured to communicate with an external network device through a network, the information processing apparatus comprising:
   a receiving unit that receives data from the external network device;
   a determining unit that determines whether a data processing is needed for the data received by the receiving unit;
   a data processing unit that, when the determining unit determines that the data processing is needed for the data, performs the data processing on the data; and
   a power control unit that switches, according to the data, a power mode of the information processing apparatus between a normal mode in which power is supplied to all components of the information processing apparatus and a power-saving mode in which power supplying is limited to selected components, wherein
   the power-saving mode includes a plurality of sub power modes each having a different number of selected components,
   the power control unit switches the power mode to a sub power mode having a lower power consumption than the normal power mode according to data received when the data processing unit is in a stopped state, and
   the data processing unit performs the data processing on the data in a switched power mode.

2. The information processing apparatus according to claim 1, wherein
   the power control unit switches the power mode based on a type of the data.

3. The information processing apparatus according to claim 1, further comprising:
   a changing unit that changes at least one of a frequency of clock and a voltage of power to be supplied to the data processing unit, wherein
   the power control unit further switches the power mode based on a change of the at least one of the frequency of clock and the voltage of power.

4. The information processing apparatus according to claim 1, wherein
   the power-saving power mode includes a plurality of sub power modes each having a different number of selected components, and
   with a condition that the data processing unit completes the data processing on the data, the power control unit switches the power mode to a sub power mode having a lower power consumption.

5. The information processing apparatus according to claim 1, wherein
   the power-saving power mode includes a plurality of sub power modes each having a different number of selected components,
   the determining unit determines whether the data processing is needed for the data depending on whether the data is a packet that needs to keep a connection with the external network device of a transmission source,
   the data processing unit performs the data processing on the data when the determining unit determines that the data is the packet that needs to keep the connection, and
   when the determining unit determines that the data is the packet that needs to keep the connection, the power control unit switches the power mode to a sub power mode having a lower power consumption with either one of a condition that the connection with the external network device is disconnected and a condition that a predetermined time is collapsed in a state where there in no communication from the external network device.

6. The information processing apparatus according to claim 1, wherein
the power-saving power mode includes a plurality of sub power modes each having a different number of selected components, and
the power control unit switches the power mode to either one of a sub power mode having a higher power consumption and the normal mode depending on data received in the power-saving power mode.

7. The information processing apparatus according to claim 1, wherein
the power-saving power mode includes a plurality of sub power modes each having a different number of selected components, and
the power control unit, when the data is a packet that is transferred in a plurality of packets, switches the power mode to either one of a sub power mode having a higher power consumption than a power mode for processing a packet that is transferred in one packet and the normal mode.

8. The information processing apparatus according to claim 1, further comprising:
a discarding unit that, when the determining unit determines that the data processing is not needed for the data, discards the data.

9. The information processing apparatus according to claim 1, wherein
the stopped state is any one of a state in which the data processing unit is in a sleep mode, a state in which a clock to the data processing unit is stopped, and a state in which a power to the data processing unit is off.

10. The information processing apparatus according to claim 1, wherein
the determining unit further determines whether to perform the data processing on the data upon determining that the data processing is needed for the data,
the data processing unit transmits the data to a processor when the determining unit determines not to perform the data processing, and
the power control unit switches the power mode to a power mode for supplying a power to the processor.

11. The information processing apparatus according to claim 7, wherein
the packet that is transferred in a plurality of packets is either one of a packet for print data and a packet for transferring scan data.

12. The information processing apparatus according to claim 10, wherein
the data processing unit, when the determining unit determines to perform the data processing, creates a response packet for the data, and transmits the response packet to the external network device.

13. An information processing method for an information processing apparatus that is configured to communicate with an external network device through a network, the information processing method comprising:
receiving data from the external network device;
determining whether a data processing is needed for the data received at the receiving;
performing, when it is determined that the data processing is needed for the data at the determining, the data processing on the data; and
switching, according to the data, a power mode of the information processing apparatus between a normal mode in which power is supplied to all components of the information processing apparatus and a power-saving mode in which power supplying is limited to selected components, wherein
the power-saving mode includes a plurality of sub power modes each having a different number of selected components,
the switching switches the power mode to a sub power mode having a lower power consumption than the normal power mode according to data received when the data processing unit is in a stopped state, and
the performing performs the data processing on the data in a switched power mode.

14. The information processing method according to claim 13, wherein
the switching switches the power mode based on a type of the data.

15. The information processing method according to claim 13, further comprising:
changing at least one of a frequency of clock and a voltage of power to be supplied to the data processing unit, wherein
the switching switches the power mode based on a change of the at least one of the frequency of clock and the voltage of power.

16. The information processing method according to claim 13, wherein
the power-saving power mode includes a plurality of sub power modes each having a different number of selected components, and
when the data processing is complete, the switching switches the power mode to a sub power mode having a lower power consumption.

17. The information processing method according to claim 13, wherein
the power-saving power mode includes a plurality of sub power modes each having a different number of selected components,
the determining determines whether the data processing is needed for the data depending on whether the data is a packet that needs to keep a connection with the external network device of a transmission source,
the performing performs the data processing on the data when the determining determines that the data is to keep the connection, and
when the performing determines that the data is the packet that needs to keep the connection, the switching switches the power mode to a sub power mode having a lower power consumption with either one of a condition that the connection with the external network device is disconnected and a condition that a predetermined time is collapsed in a state where there in no communication from the external network device.

18. The information processing method according to claim 13, wherein
the power-saving power mode includes a plurality of sub power modes each having a different number of selected components, and
the switching switches the power mode to either one of a sub power mode having a higher power consumption and the normal mode depending on data received in the power-saving power mode.

19. The information processing method according to claim 13, wherein
the power-saving power mode includes a plurality of sub power modes each having a different number of selected components, and the switching, when the data is a packet that is transferred in a plurality of packets, switches the power mode to either one of a sub power mode having a higher power consumption than a power mode for processing a packet that is transferred in one packet and the normal mode.

20. A computer program product comprising a computer-usable medium having computer-readable program codes embodied in the medium that when executed cause a computer to execute:

receiving data from the external network device;

determining whether a data processing is needed for the data received at the receiving;

performing, when it is determined that the data processing is needed for the data at the determining, the data processing on the data; and switching, according to the data, a power mode of the information processing apparatus between a normal mode in which power is supplied to all components of the information processing apparatus and a power-saving mode in which power supplying is limited to selected components, wherein the power-saving mode includes a plurality of sub power modes each having a different number of selected components, the switching switches the power mode to a sub power mode having a lower power consumption than the normal power mode according to data received when the data processing unit is in a stopped state, and the performing performs the data processing on the data in a switched power mode.

* * * * *